UNITED STATES PATENT OFFICE.

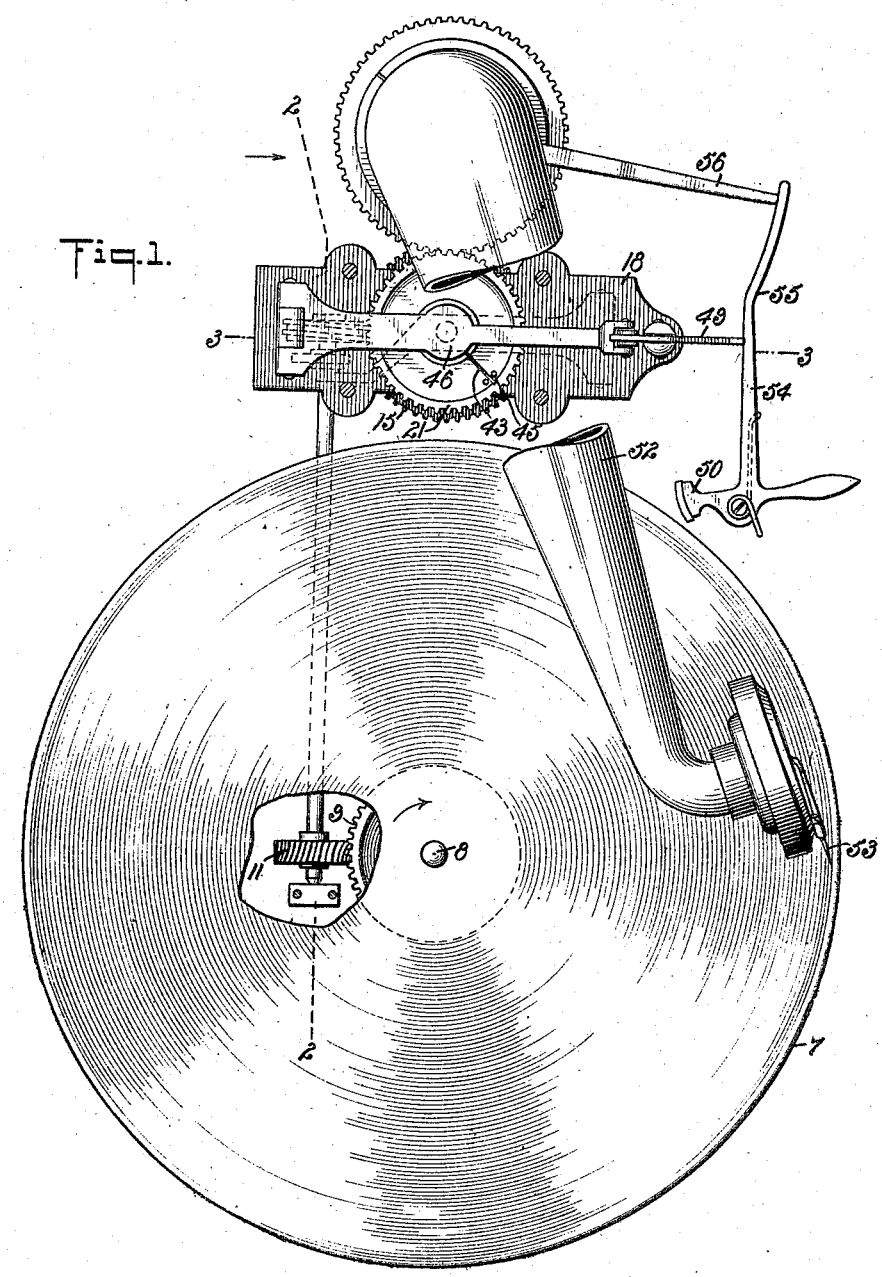

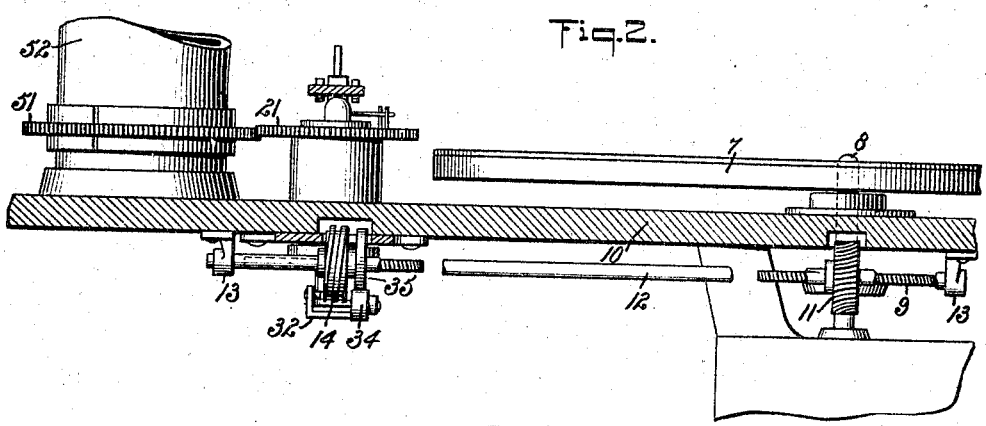
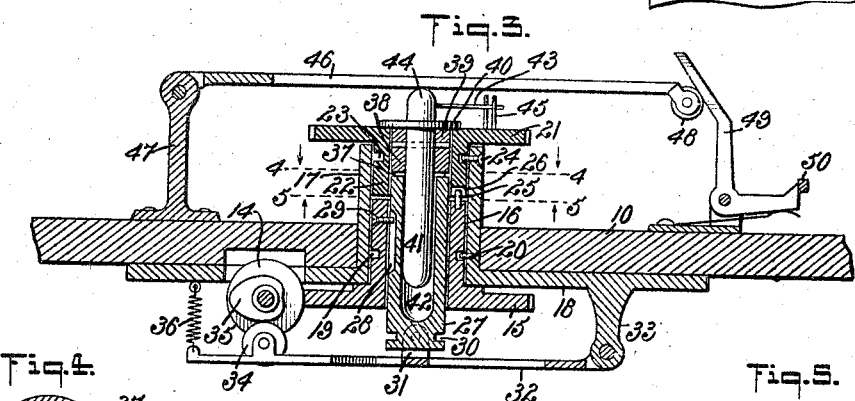
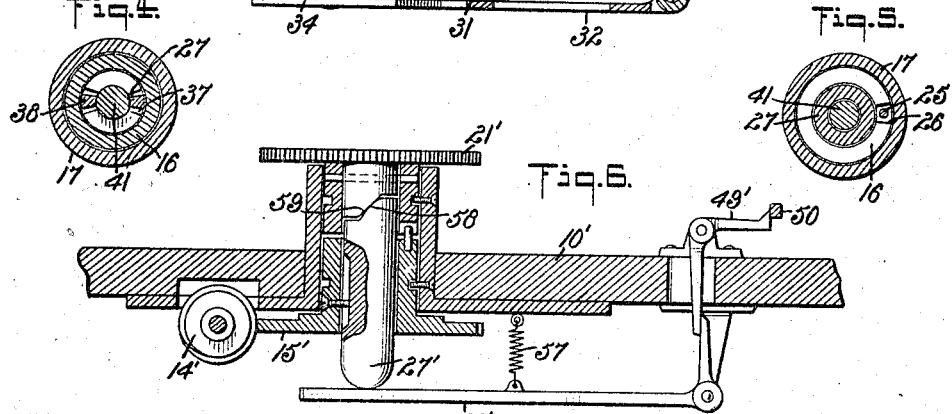

ANDRÉ JUNOD, OF NEW YORK, N. Y.

AUTOMATIC STOP FOR TALKING-MACHINES.

1,228,564.　　　　Specification of Letters Patent.　　Patented June 5, 1917.

Application filed May 23, 1916.　Serial No. 99,274.

*To all whom it may concern:*

Be it known that I, ANDRÉ JUNOD, a citizen of Switzerland, and a resident of the city of New York, borough of Manhattan, in the county and State of New York, have invented a new and Improved Automatic Stop for Talking-Machines, of which the following is a full, clear, and exact description.

My invention relates to an automatic stop for talking machines which coöperates with the brake of the talking machine and automatically applies the brake to the plate or record support when the end of a sound groove is reached by the stylus. The object of the invention is to provide a simple, efficient and sensitive stop which can be made to apply the brake as soon as the end of the sound groove is reached or at a certain interval of time after the end of the sound groove has been reached by the stylus.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Figure 1 is a plan view of a talking machine equipped with my stop, the amplifying arm being partly broken out to show the details of construction;

Fig. 2 is a vertical section on line 2—2, Fig. 1;

Fig. 3 is a vertical section on line 3—3, Fig. 1;

Fig. 4 is a horizontal section on line 4—4, Fig. 3;

Fig. 5 is a similar section on line 5—5, Fig. 3; and

Fig. 6 is a longitudinal section through a modified form of the automatic stop.

Referring to the drawings, 7 is the record support connected to the shaft 8 of the motor (not shown). The shaft carries also a worm wheel 9 below the top 10 of the talking machine housing. The wheel is constrained to rotate with the shaft and is in mesh with a worm 11 carried by a shaft 12 supported in suitable bearings 13 suspended from the housing top 10. The shaft 12 carries also a worm 14 which meshes with a worm wheel 15 the collar 16 of which wheel bears within a socket 17 extending through the housing top 10. The socket has a flange 18 at the under side of the top whereby the socket is secured to the top. The collar 16 has a circular groove 19 engaged by a pin 20 carried by the socket whereby the wheel 15 is free to turn but prevented from axial displacement within the socket.

A gear 21 is mounted to revolve on the top of the socket. It has a collar 22 which bears within the socket 16. The collar 22 has a circular groove 23 engaged by a pin 24 carried by the socket and which allows a rotary movement of the gear 21 but prevents an axial displacement of the same relative to the socket. The collar 16 of the wheel 15 carries a pin 25 which engages a notch 26 in the collar 22 whereby the two gears have a limited relative rotary movement.

A plunger 27 is mounted co-axially within the collar 16. Its axial movement therein is limited by a groove 28 which engages a pin 29 carried by the collar. This pin constrains the plunger to rotate with the wheel 15. The end of the plunger projecting through the wheel has a circular groove 30 engaged by the pins of a yoke 31 forming part of an arm 32, one end of which is pivotally attached to the extension 33 of the flange 18. The other end of the arm carries a roller 34 which is maintained against a cam 35 on the shaft 12 by a spring 36. The cam, being constrained to rotate with the shaft, reciprocates the plunger within the collar.

The end of the plunger projecting above the collar has a pair of diametrically-opposite notches 37 which are in register with teeth 38 of a member 39 alining with the plunger 27 and supported by the gear 21 within its collar through the medium of a flange or head 40 provided on said member. The member 39 has a downward extension 41 entering a bore 42 in the plunger and whereby an additional guide for said member is provided to prevent the binding of the same in the collar 22 when said member 39 is moved axially. The said member is coupled to rotate with the gear 21 by a yielding member 43 which extends from the upward extension 44 of the member 39 to pins 45 carried by the gear.

The upward extension 44 of the member 39 supports an arm 46, one end of which is pivoted to a bracket 47 rising from the housing top 10. The other end of said arm carries a roller 48 which bears against a spring-actuated trip 49. The trip normally prevents the spring-actuated brake shoe 50 from engaging the record support 7.

The gear 21 meshes with a gear 51 carried frictionally by the amplifying arm 52 of the talking machine. The gear 51 will rotate the gear 21 as the amplifying arm is moved by the spiral sound groove of the disk. The ratio of said gears 51 and 21 is such that the speed of said gear 21 is equal to the speed of the wheel 15. When the stylus 53 has reached the end of the spiral sound groove on the record, the movement of the amplifying arm 52 is arrested and therewith the rotation of the gear 21, while the rotation of the wheel 15 continues. The plunger 27 reciprocates a few times for a single revolution of the wheel 15. With each reciprocation the notches 37 of the plungers are moved out from engagement with the teeth 38 of the member 39.

As the wheel 15 and the gear 21 rotate the teeth and the notches are maintained in register, but when the gear 21 is arrested and the wheel 15 continues to rotate, the register between the teeth 38 and the notches 37 is disturbed. Therefore, as the plunger 27 goes up the teeth 38 will not register with the notches 37 and, consequently, the member 39 is raised from the gear 21, carrying therewith the arm 46 which operates the trip 49, releasing the shoe 50 which comes into engagement with the support 7, thus the movement of the motor is arrested. If, at the moment when the gear 21 is arrested, the plunger moves upward, the teeth 38 will engage the notches 37, the movement of the wheel 15 will entrain the member 39, thus stressing the yielding member 43 until the plunger 27 disengages the member 39, which will then be restored to its normal position by the yielding member 43. When the plunger 27 returns under the action of the spring 36 it will raise the member 39 and operate the trip 49, as stated. The notch 26 in the collar 22 is sufficiently wide to allow enough angular displacement to the wheel 15 relative to the gear 21 to permit a complete stroke to the plunger 27.

To reset the machine the amplifying arm 52 is raised and swung to the margin of the record. In view of the fact that the gear 21 and the worm wheel 15 have a relative angular displacement, the movement of the amplifying arm to the margin of the disk will rotate therewith the gear 21 until the pin 25 engages the end wall of the notch 26, when the amplifying arm will rotate in the split collar of the gear 51. During the angular displacement of the gear 21 the teeth 38 of the member 39 will be brought into register with the notches 37 of the plunger 27, thus allowing the member 39 to drop, and therewith the arm 46, bringing the trip 49 to its normal position.

To clear the way for the trip, the arm 54 of the shoe must be cleared from the end of the trip. For this purpose the arm 54 has an arcuated extension 55 engageable by an arm 56 participating in the movement of the amplifying arm 52. The arm 56 engages the arcuated extension after said arm has been moved a predetermined distance away from the central part of the disk. This engagement of the arm 56 with the arcuated portion displaces the shoe 50 and clears the way for the trip, which can then be restored to its normal position when the member 39 drops to rest on the gear 21.

In the modified structure the plunger 27' is directly in contact with an arm 46' which is disposed below the housing top 10', the arm 46' being maintained against the plunger 27' by a spring 57. The plunger 27' has a beveled surface 58 which engages a beveled surface 59 provided within the collar of the gear 21, the rotation of the wheel 15' by the worm 14' when the gear 21' is arrested by the engagement of the stylus with the end of the spiral sound groove, causing the inclined plane 58 to travel on the inclined plane 59. The gear 21', being prevented from axial displacement, forces the plunger 27' to move axially and operate the arm 46' which displaces the trip 49'. In the modified structure the plunger 27' is reciprocated only when the wheel 15' runs ahead of the gear 21'. The operation of the two structures is identical, depending on the arrest of the gear 21' while the wheel 15' continues to rotate.

I claim:

1. An automatic stop for talking machines comprising in combination a movable record, a movable amplifying arm, a brake for arresting the movement of the record, a sliding member mounted to revolve and slide when the record is revolved, a second member coupled to revolve with the first so as to have a predetermined angular displacement relative thereto, motion-transmission means from the arm to said second member to synchronize the movement of said second member with the first when said arm is displaced by the record, and motion-transmission means from said second member to the brake becoming operative when the synchronism between the two members is disturbed.

2. An automatic stop for talking machines comprising in combination a movable record, a movable amplifying arm, a brake for the record, a member mounted to revolve motion-transmission means from the record to said member to revolve the same, a second revoluble member coöperatively disposed with the first, motion-transmission means from the arm to said second member for rotating said second member in synchronism with the first when said arm is displaced by the record, a sliding member associated with one of said revoluble members, means for operating said sliding member when the synchronism between said revoluble member is disturbed, and motion-transmission means from said sliding member to the brake.

3. An automatic stop for talking machines comprising in combination a record mounted to rotate, a movable amplifying arm coöperating with the record, a brake shoe for arresting the movement of the record, a member mounted to revolve, motion-transmission means from the record to said member to revolve the same, a second revoluble member coupled to the first and having relative to the first a predetermined angular displacement, motion-transmission means from the arm to said second member to revolve the member in the same direction and at the same speed as the first member is revolved, tripping means for the brake, and means from one of said members to the tripping means becoming operable when the synchronism between the two revoluble members is disturbed.

4. An automatic stop for talking machines comprising in combination a movable record, a movable amplifying arm coöperating with the record, a brake for the record, a member mounted to revolve, motion-transmission means from the record to said member for revolving the same, a second revoluble member coupled to the first so as to have a predetermined relative angular displacement, motion-transmission means from the arm to said second member to rotate the member in the same direction and speed as the first member when said arm is coöperating with the record, a slide carried by one of said members, slide operating means carried by the other member to displace the slide when the synchronism between the two revoluble members is disturbed, and tripping means from the slide to the brake.

5. An automatic stop for talking machines comprising in combination a movable record, a movable amplifying arm for coöperating with the record, a brake for the record, a member mounted to revolve, motion-transmission means from the record to said member to revolve the same, a second member mounted to revolve with the first and having an angular displacement relative to the first member, motion-transmission means from the arm to said second member for rotating said second member in synchronism with the first when said arm is coöperating with the record, a slide carried by one of said revoluble members, slide-operating means carried by the other of said members in register with the slide, said slide-operating means becoming operative when the synchronism between the two revoluble members is disturbed, and tripping means connecting the slide with the brake.

6. An automatic stop for talking machines comprising in combination a revoluble record, a movable amplifying arm for coöperating with the record, a brake for the record, a revoluble member, motion-transmission means from the record to said revoluble member, a second revoluble member, motion-transmission means from the arm to the second revoluble member for revolving the said second member in the same direction with the first and at the same speed, when said arm coöperates with the record, a plunger in one of said revoluble members constrained to revolve with said member and free to move axially therein, means for moving said plunger axially operable by the motion-transmission means for said revoluble member, a sliding member carried by the other of said revoluble members in register with the plunger, said sliding member being constrained to revolve with said second revoluble member, said plunger and sliding member failing to register when the synchronism between the revoluble member is disturbed, whereby the sliding member is operated by the plunger, and tripping means from the sliding member to the brake.

7. An automatic stop for talking machines comprising in combination a revoluble record, a movable amplifying arm for coöperating with the record, a brake for the record, a revoluble member, motion-transmission means from the record to the revoluble member, a second revoluble member, motion-transmission means from the arm to said second revoluble member to rotate said second member in the same direction as the first and with the same speed when said arm is coöperating with the record, a plunger in one of said revoluble members constrained to rotate therewith, means for actuating the plunger operable from the motion-transmission means for the revoluble member, a sliding member coupled yieldingly to the second revoluble member and maintained in register with the plunger when the two revoluble members are moving in synchronism, said plunger and sliding member failing to register when the synchronism of the two revoluble members is disturbed, whereby the sliding member is operated by the plunger, and tripping means from the sliding member to the brake.

8. An automatic stop for talking machines comprising in combination a revoluble record, a movable amplifying arm for coöperating with the record, a brake for the record, a revoluble member, motion-transmission means from the record to the revoluble member, a second revoluble member, motion-transmission means from the arm to said second revoluble member to rotate said second member in the same direction and at the same speed as the first member is rotated by the record, a plunger in one of said revoluble members constrained to rotate therewith, means for actuating the plunger operable from the motion-transmission means for the revoluble member, a sliding member coupled yieldingly to the second revoluble member and retained by said second member in register with the plunger when the two members are moving in synchronism, means coupling the two revoluble members whereby they have a predetermined relative angular displacement, tripping means for the brake, and means connecting the tripping means to the sliding member.

9. An automatic stop for talking machines comprising in combination a revoluble record, a movable amplifying arm for coöperating with the record, a brake for the record, a revoluble member, motion-transmission means from the record to the revoluble member, a second revoluble member, motion-transmission means from the arm to said second revoluble member to rotate said second member in the same direction as the first and with the same speed when said arm is coöperating with the record, friction means coupling the motion-transmission means of the second member to the arm, a plunger in one of said revoluble members constrained to rotate therewith, means for actuating the plunger operable from the motion-transmission means for said revoluble member, a sliding member coupled yieldingly to the second revoluble member to rotate therewith and maintained in register with the plunger by said second member when the two revoluble members are moving in synchronism, tripping means for the brake, and a pivotal arm engaging the tripping means and supported by the sliding member, substantially as and for the purpose set forth.

10. An automatic stop for talking machines comprising in combination a revoluble record, a movable amplifying arm coöperating with the record, a brake for the record, a revoluble member, motion-transmission means from the record to the revoluble member, a second revoluble member, motion-transmission means from the arm to said second revoluble member to rotate said second member in the same direction as the first and with the same speed when said arm is coöperating with the record, friction means coupling the motion-transmission means of the second member to the arm, a plunger in the first revoluble member constrained to rotate therewith, means for actuating the plunger a number of times for a single revolution of the revoluble member operable from the motion-transmission means for the first revoluble member, a sliding member in said second revoluble member, said plunger and sliding member having interengaging means adapted to register when the two members are moved in synchronism, said plunger adapted to displace when the synchronism between the two members is disturbed, means coupling yieldingly said sliding member to cause said sliding member to rotate with said second revoluble member, a trip for the brake, and a pivotal arm engaging the trip, said arm being supported by the sliding member and adapted to be displaced by said sliding member when said sliding member is displaced by the plunger.

11. An automatic stop for talking machines comprising in combination a revoluble record, a movable amplifying arm, a brake for the record, a revoluble member, motion-transmission means from the record to the revoluble member, a second revoluble member, motion-transmission means from the arm to said second revoluble member to rotate said second member in the same direction as the first and with substantially the same speed when said arm is moved by the record, a plunger in each of said revoluble members constrained to rotate therewith, means for actuating one of the plungers a number of times for a single revolution of the revoluble member in which the plunger is mounted, and tripping means for the brake associated with the other plunger, said plungers having interengaging means registering when the two revoluble members are moved in synchronism, the registration of said plungers adapted to be disturbed when the synchronism between the revolving members is disturbed.

12. An automatic stop for talking machines comprising in combination a movable record, a movable amplifying arm, a brake for arresting the movement of the record, a pair of coaxial members mounted to slide and revolve, motion-transmission means from the record to one of the members, motion-transmission means from the other member to the arm to move said other member in substantially the same direction as the first and at substantially the same speed, said members having means adapted to register, and which means leave to said members a relatively angular displacement, means for sliding one of said members, and tripping means for operating the brake associated with the other member.

13. An automatic stop for talking machines comprising in combination a revoluble record, a movable amplifying arm, a brake for the record, a member mounted to revolve and move longitudinally, motion-transmission means from the record to the member to revolve it and to move it longitudinally, a second member mounted to revolve and slide longitudinally in engagement with the first so as to have an angular displacement relative to the first member, motion-transmission means from the arm to said second member to revolve it in the same direction and at substantially the same speed as the first member, and tripping means connecting said second member to said brake for operating the brake by the longitudinal displacement of said first member after said first member has been displaced through an angular distance.

14. An automatic stop for talking machines comprising in combination a plunger mounted to rotate, means for translating and rotating the plunger, a sliding member mounted to revolve in the same direction as the plunger, means for rotating said sliding member in synchronism with the plunger, means coupling the plunger to the sliding member so that a relatively angular displacement may take place between the two, said coupling means causing the translation of said sliding member by said plunger when the synchronism between the plunger and the sliding member has been disturbed, and tripping means operable by the translation of said sliding member.

15. An automatic stop for talking machines comprising in combination a pair of coaxially disposed members mounted to rotate about the axis and translate longitudinally thereof, means for rotating and translating one of said members, means for rotating only the other of said members in the same direction and at substantially the same speed as the first, coupling means between the two members affording a relatively angular displacement between the two members and adapted to translate the second member by the first when the synchronism in the rotation of the two members is disturbed, and tripping means operable by the translation of the second member.

ANDRÉ JUNOD.